(12) United States Patent
Mehta et al.

(10) Patent No.: US 7,998,007 B2
(45) Date of Patent: Aug. 16, 2011

(54) PHASING OF CHAINS, SPROCKETS, AND GEARS TO PROVIDE ENHANCED NOISE VIBRATION AND HARSHNESS REDUCTION

(75) Inventors: Yogesh Mehta, Rochester, MI (US); Sue Stroope, Oxford, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 489 days.

(21) Appl. No.: 11/888,845

(22) Filed: Aug. 2, 2007

(65) Prior Publication Data

US 2008/0070728 A1 Mar. 20, 2008

Related U.S. Application Data

(60) Provisional application No. 60/835,406, filed on Aug. 3, 2006.

(51) Int. Cl.
*F16H 7/00* (2006.01)

(52) U.S. Cl. .......... 474/84; 474/148; 474/164; 474/152; 474/212; 474/213

(58) Field of Classification Search .............. 474/84; 74/443
See application file for complete search history.

(56) References Cited

U.S. PATENT DOCUMENTS

| | | | |
|---|---|---|---|
| 5,427,580 A | 6/1995 | Ledvina et al. | |
| 5,437,581 A * | 8/1995 | Ledvina et al. | 474/85 |
| 5,470,282 A | 11/1995 | Ledvina et al. | |
| 5,562,557 A * | 10/1996 | Ledvina et al. | 474/84 |
| 5,690,568 A | 11/1997 | Watson | |
| 5,690,571 A * | 11/1997 | Mott | 474/212 |
| 5,816,967 A | 10/1998 | Ledvina et al. | |
| 5,846,149 A | 12/1998 | Ledvina et al. | |
| 5,857,933 A | 1/1999 | Patton | |
| 5,980,406 A | 11/1999 | Mott et al. | |
| 6,030,306 A | 2/2000 | Young | |
| 6,106,425 A | 8/2000 | Mott | |
| 6,190,278 B1 | 2/2001 | Merelli et al. | |
| 6,267,701 B1 * | 7/2001 | Mott | 474/164 |
| 6,402,654 B1 | 6/2002 | Lanzon et al. | |
| 2002/0121152 A1 | 9/2002 | White et al. | |
| 2005/0209033 A1 | 9/2005 | Ledvina et al. | |

* cited by examiner

*Primary Examiner* — Robert Siconolfi
*Assistant Examiner* — San Aung
(74) *Attorney, Agent, or Firm* — Warn Partners, P.C.

(57) ABSTRACT

A method for reducing NVH in a vehicle having the steps of providing at least one repeating event, replicating at least one component, and delaying at least one equivalent part. The repeating event is a complete cycle, such that the repeating event ends when the cycle begins to repeat itself. The component is replicated at least one time so that at least one equivalent part is formed. The equivalent part is delayed with respect to the component by angularly positioning the equivalent part with respect to the component in a predetermined way, such that at least one harmonic in the NVH-spectra is reduced during the component's repeating event and the equivalent part's repeating event in operation.

1 Claim, 8 Drawing Sheets

(2 of 8 Drawing Sheet(s) Filed in Color)

PHASING OF CHAINS, SPROCKETS, AND GEARS TO PROVIDE ENHANCED NOISE VIBRATION AND HARSHNESS REDUCTION

CROSS-REFERENCE TO RELATED APPLICATIONS

This application claims the benefit of U.S. Provisional Application No. 60/835,406, filed Aug. 3, 2006.

BACKGROUND OF THE INVENTION

Almost all vehicles utilize a transfer case, a transmission, or both, in which gears, sprockets, and chains are used along with various other components to transfer torque in order to move the vehicle. For example, torque is applied to a first gear from a motor or other driving device which is operably connected to a second gear. As the torque is applied to the first gear, the first gear rotates and moves the second gear in order to transfer the torque. The same principle is applied to sprockets, where a chain operably connects two sprockets. Again, torque is transferred through the transfer case or transmission in order to move the vehicle. Torque is applied to a first sprocket, and the rotation of the first sprocket moves a chain which causes a second sprocket to rotate and transfer the torque.

However, undesirable noise, vibration, or harshness (NVH) can be produced by the components in the transmission or transfer case. The NVH is produced because of the constant contacting of the chain with the sprockets or the contact between the gears. The NVH is undesirable because it causes vibrations which reduce the efficiency and durability of components on the vehicle, and it produces noise and vibrations which are felt by the vehicle's occupants. The vibrations produced by the components can also cause other components to come loose or reduce the durability of other components.

Therefore, it is desirable to develop a method for reducing NVH caused by the components when in use. It is desirable to develop a system that utilizes the same (or similar to original) components so that the system does not need to be reconfigured while maintaining the distribution of forces applied to the components during the use of the system.

SUMMARY OF THE INVENTION

The present invention relates to a method for reducing NVH in a vehicle providing the steps of providing at least one repeating event, replicating at least one component that causes the repeating event to create at least one equivalent part, and delaying at least one equivalent part with respect to the original component. The at least one repeating event is a complete cycle, such that the repeating event ends when the cycle begins to repeat itself. The at least one component is replicated at least one time so that at least one equivalent part is formed. The at least one equivalent part is delayed with respect to the component by a predetermined amount, such that at least one harmonic in a NVH-spectra is reduced during the component's repeating event and the equivalent part's repeating event.

NVH generated by any repeating event can be described in terms of "harmonics". In theory, there are infinite harmonics starting from one. These harmonics occur at specific frequencies depending upon how fast the events are repeating themselves. NVH at these harmonics (especially lower harmonics) is of very high concern. Exactly which harmonics are most dominant can be experimentally determined. This invention paves for a way to provide an inventive method to minimize some or all of the problem harmonics in a NVH spectra.

Let F(t) be a periodic event with a period of repetition T, then:

$$F(t) = F(t + \delta T); \text{ where } \delta \text{ is } 1, 2, 3 \ldots$$

By Fourier theorem, $$F = a_0 + \sum_{n=1}^{\infty} a_n \cos(\omega_n t) + b_n \sin(\omega_n t);$$

where n is the harmonic, t is time,

T is the period of repetition, $a_n, b_n$, and $a_0$ are Fourier coefficients, and $$w_n = n \frac{2\pi}{T}.$$

Thus, the above equation shows that any repeating event F(t) can be described as a linear combination of harmonics. The above equations are also valid for all of the components that produce repeating events while in operation. Unless otherwise stated, the word "harmonic(s)" means harmonic(s) of the repeating event.

In every component of interest, a certain event would mark the start of a repeating event. Depending upon the component geometry, the start of the event may or may not be arbitrarily chosen. Similarly, there would an event marking the end of the repeating event. The time it takes to complete a repeating event will be represented by T.

In an arrangement comprising of a component and m−1 equivalent parts making a total of m "like" or "geometrically similar" entities and producing m repeating events while in action, ideally the phasing would be done in a way such that the starts of repeating events for two consecutive entities are $$\frac{T}{m}$$

apart and no two repeating events start at the same time. Strictly speaking, the delaying should be such that the starts of each of the m−1 events leads the start of one and only one repeating event by $$\frac{T}{m}$$

and no two repeating events start at the same time. The instance where two consecutive entities are $$\frac{T}{m}$$

apart is a sub-case of this general statement. In this arrangement, the harmonics that are a multiple for m are unaffected while all the rest are completely annulled. The number $$\frac{T}{m}$$

has been derived after solving mathematical equations for the system. In general, the higher the m, the better (lower) the NVH response would be. It should be noted that phasing of component and equivalent parts means delaying of the start of the repeating events of the component and equivalent parts.

There might be a practical limitation on how large m can be in a system of m like entities. In general, phasing the two consecutive repeating events by $$\frac{T}{m}$$

where no two events start at the same time is the best arrangement. This type of phasing would henceforth be called as "symmetrical delaying". Although symmetrical delaying is the best way to obtain desirable NVH solution, in some cases it may require too many replications to be made on the original component. The exact number of replications required depends upon the NVH problem being addressed. Hence, sometimes, it might be beneficial (depending upon the problem at hand) to have delay values other than as governed by the "symmetrical delaying" rule and obtain some sort of a "compromise" or "next to best" solution. This form of delaying that is not governed by the rule of "symmetrical delaying" will be referred to as "asymmetrical delaying". Words phasing and delaying are interchangeably used in this document.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The patent or application file contains at least one drawing executed in color. Copies of this patent or patent application with color drawings will be provided by the Office upon request and payment of the necessary fee.

The present invention will become more fully understood from the detailed description and the accompanying drawings, wherein.

Figure 9:
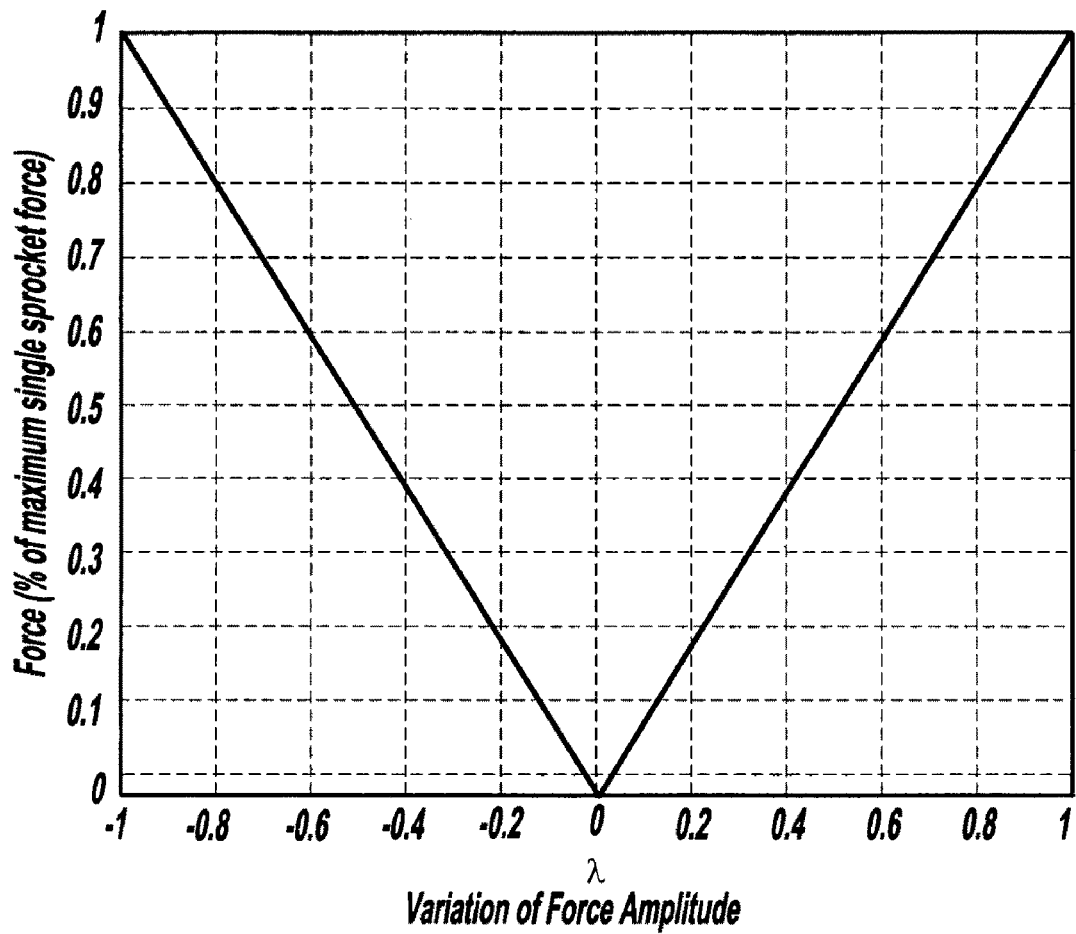
Figure 10:
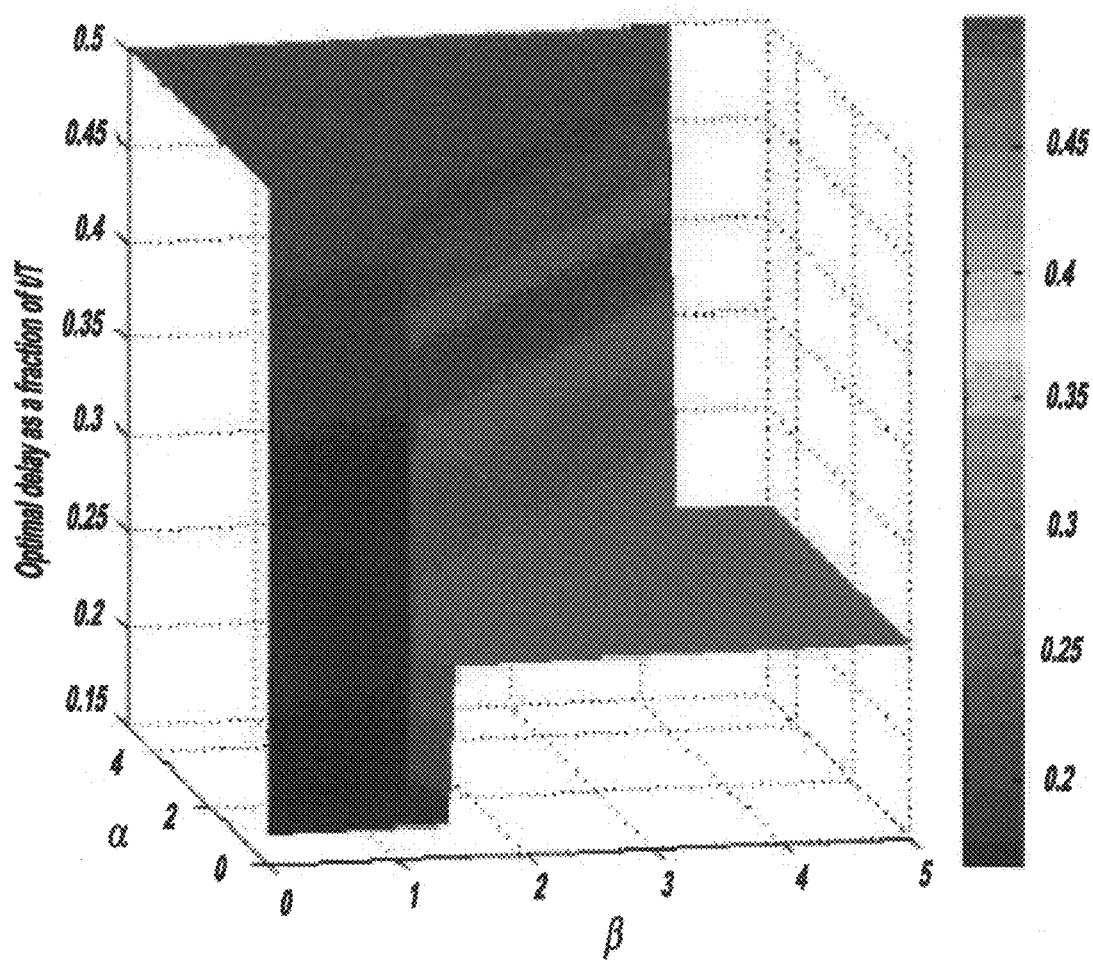

when one component and one phased equivalent part (m=2) are used. On the x axis, ξ signifies $$\frac{2\pi y}{T} \text{radians or } \frac{360° \ y}{T}$$

where y is the error in time delay from its ideal delay time;

FIG. 9 is a line graph depicting the effect of an uneven load distribution on a component and at least one delayed equivalent part (m=2) on the NVH when one component and one ideally phased $$\left(\text{i.e. with } \frac{T}{2} \text{ delay}\right)$$

equivalent part are used. Here, λ=0 corresponds to equal distribution of loads on component and the equivalent part, while λ=±1 represents the case when either the original component or the equivalent part takes all the load; and FIG. 10 is a graph illustrating optimal delay angles for a component and an equivalent part (m=2). The objective for this exercise was to minimize the sum of first, second and third harmonics such that the first and second harmonics are α and β times more important than the third respectively where α and β are positive numbers.

DETAILED DESCRIPTION OF THE PREFERRED EMBODIMENTS

The following description of the preferred embodiment(s) is merely exemplary in nature and is in no way intended to limit the invention, its application, or uses.

Figure 1:
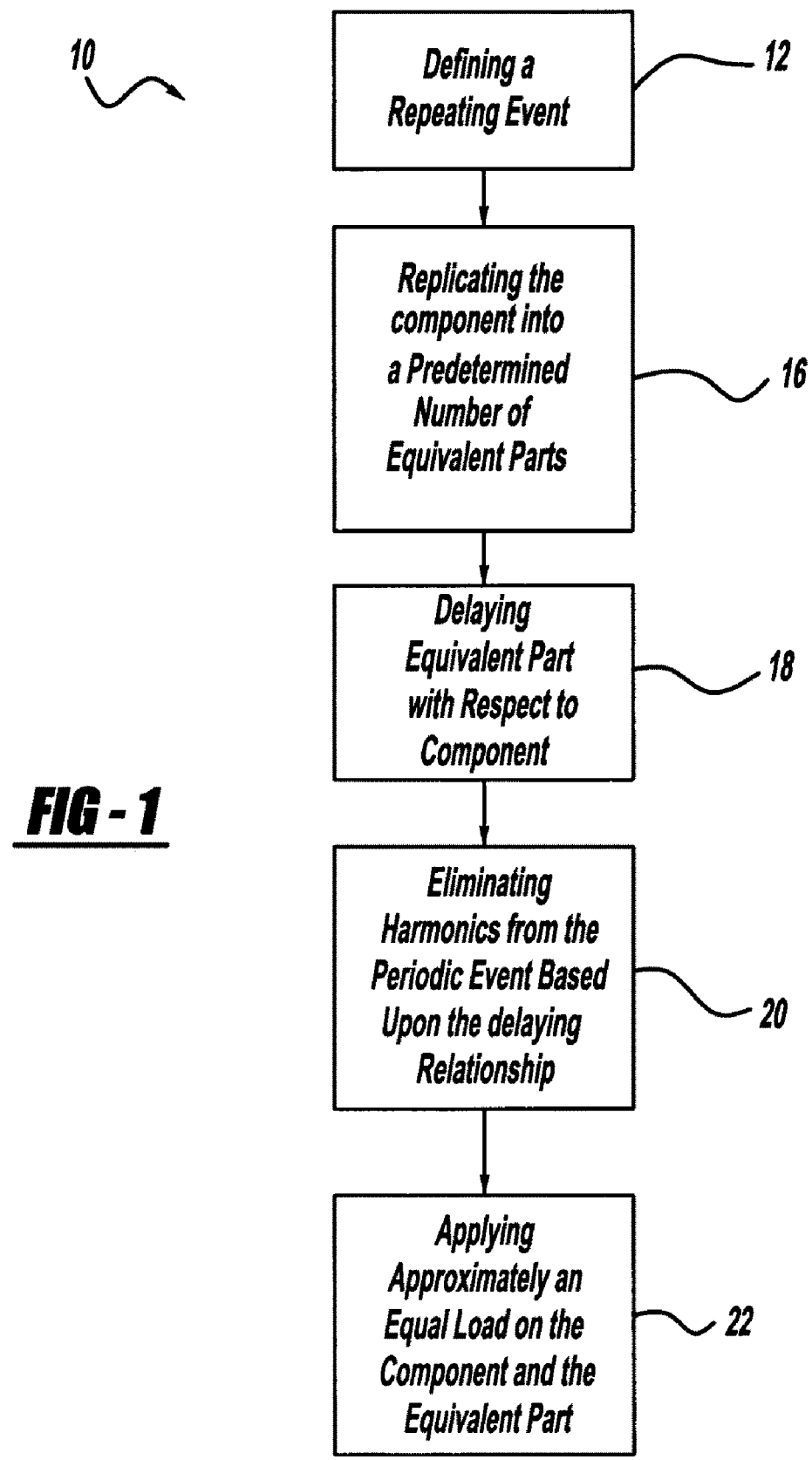
FIG. 1 is a flow chart of a method for delaying an equivalent part with respect to a component in accordance to the present invention.

Referring to FIG. 1, a method for reducing NVH on a vehicle is generally shown at 10. First, a repeating or periodic event is defined (identified) at decision box 12. The repeating event is defined by a complete cycle, such that the repeating event ends when the cycle begins to repeat itself. Thus, the repeating event is defined by one completion of a cycle that repeats itself. In a preferred embodiment, the torsional force transfer components are operating under steady state conditions. A component operates in a steady state condition when the repeating event occurs at the same rate as the immediately proceeding repeating event. However, it should be appreciated that the components can operate in what appears to be non-steady state conditions, since a non-steady state condition is eventually a steady state condition over a sufficiently large finite period of time.

At decision box 16 the component is replicated a predetermined number of times to form at least one equivalent part. How many replications need to be performed depends upon the NVH problem being addressed. The equivalent part that is produced from the replication has substantially the same design and functions as the original component. One form of replication is to construct a component and then construct an equivalent component. In some cases, a form of replication is to construct the original component and then splice the component to create an equivalent component. However, when the component has been spliced the component and resulting equivalent part(s) are now a portion of the width of the component in its original state. The component and the equivalent part(s) may or may not be cast on the same block of material. For example, in FIGS. 5-6, the component and the equivalent part(s) are both on the same block of material. However, this is not necessary and the component and equivalent part(s) may exist independent of each other, at different locations. The advantage of casting them on the same material piece is that it occupies less space and hence is more packaging friendly.

After the equivalent part has been produced, the equivalent part is phased or delayed with respect to the component at decision box 18. When the equivalent part is delayed, the equivalent part is delayed a predetermined amount with respect to the component. Therefore, the start of equivalent part's repeating event is moved or phased with respect to the start of component's repeating event by a predetermined amount. The exact values of the phasing angles depend upon the NVH problem being addressed.

At decision box 20, the delaying of the equivalent part(s) with respect to the component eliminates or reduces harmonic(s) of concern in NVH-spectra from the repeating event of the component and equivalent part(s). Any repeating event manifests itself as a plurality of harmonics in NVH spectra, where a harmonic is a sine wave with its frequency as an integer multiple of the frequency of the repeating event. Theoretically, the NVH produced by the repeating events can be described as a predetermined linear combination of harmonics. The elimination or reduction of the harmonic(s) eliminates or reduces the NVH produced by component alone. Theoretically, the "symmetrical delay"

$$\left(\text{using the } \frac{T}{m} \text{ rule}\right)$$

of the equivalent part(s) with respect to the component should completely eliminate the harmonics that are a multiple of m, and thus completely eliminate the NVH produced at those harmonics. However, due to tolerances of machined parts, the equivalent part(s) may not be exactly symmetrically delayed, which results in the reduction rather than elimination of the aforesaid harmonics.

The harmonics that are eliminated or reduced from the repeating event are based upon the phasing relationship between the component and the equivalent part(s). Preferably, at decision box 22 an approximately equal load is applied to both the component and the equivalent part(s). By applying approximately an equal load to the component and the equivalent part(s), the durability of the component and the equivalent part(s) is increased with respect to a component and delayed equivalent part(s) where the load is not equally distributed, since an excessive amount of force is not applied to either the component or the equivalent part(s). Equal loading to the component and equivalent part(s) creates the best reduction or elimination of NVH for specific harmonics, as shown in FIG. 9.

Figure 2:
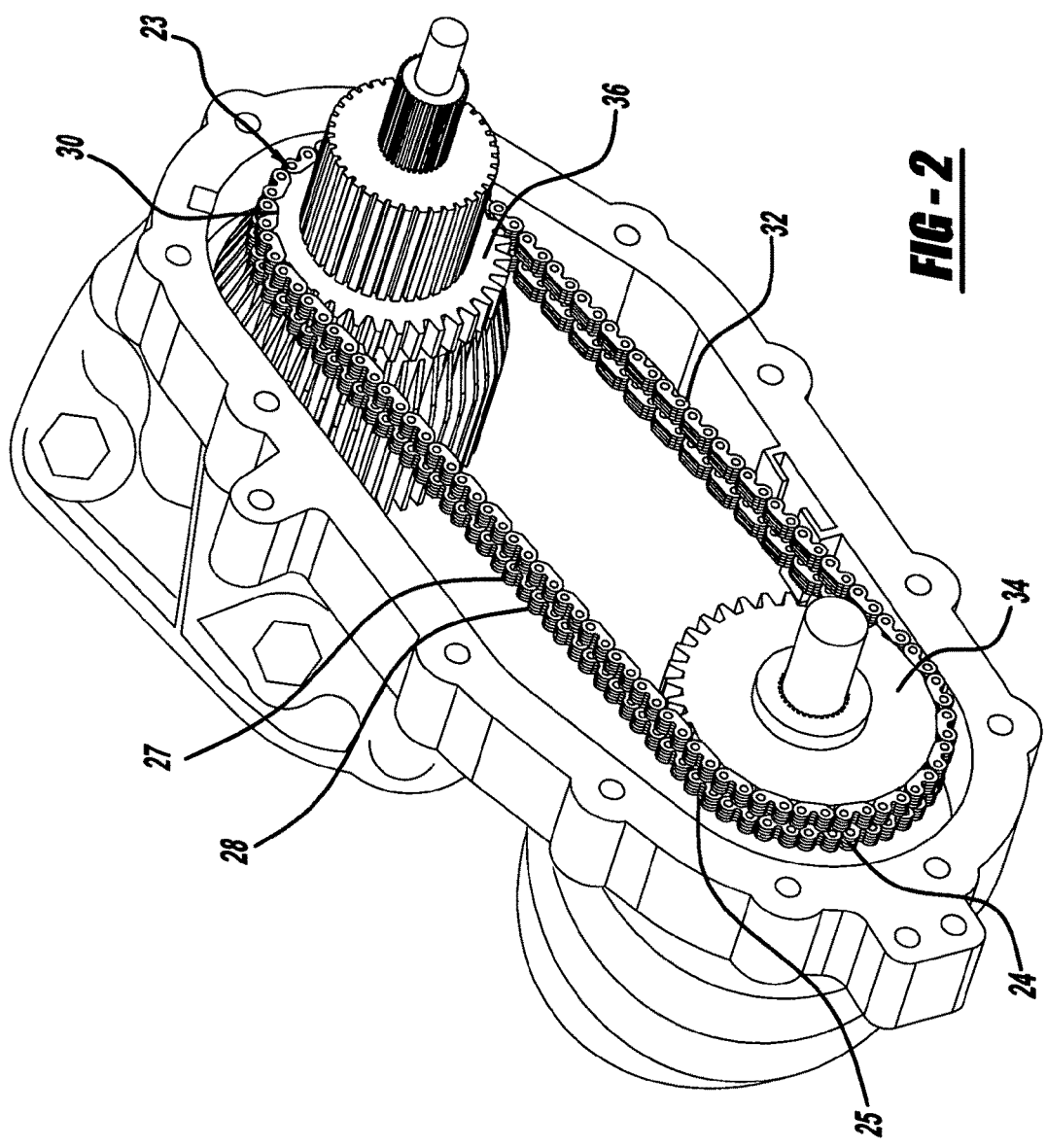
FIG. 2 is a side perspective view of a chain assembly having an equivalent part delayed with respect to a component in accordance with an embodiment of the present invention.

Referring to an embodiment as shown in FIG. 2, the component can be a chain assembly generally indicated at 23 having an endless chain 24 fabricated by a combination of links 25. For the purpose of NVH, chain 24 is typically fabricated from at least two types of links 25 that slightly differ in their geometry. The different links 25 are arranged in a predetermined set pattern to complete a full length chain 24. The random combination of links 25 will be maintained for any replacement chain. The random combination of links 25 is a development prior to the present invention. The chain 24 is endless because an arbitrary beginning at a link or blue link 28 is connected to an end at an adjacent link 27. The beginning and end of the chain are arbitrary because any point of the endless chain 24 is the beginning and end of the repeating event as created by the rotation of the chain 24. The repeating event completes when the component 24 pattern starts to repeat itself. This repeating event may be equal to, or shorter than, a period of chain 24 rotation depending upon the pattern of links 25. However, for the reasons of simplicity and without the loss of generality, all further discussions assume the repeating event to be the same as the complete rotation of the chain 24. Thus, the repeating event is defined by a complete rotation of the chain 24 where the blue link 28 completes a full cycle and returns to its initial position. Typically, in application, with a chain 24 being used for example but not limited to, a transfer case, the period of repetition and period of rotation coincide. As mentioned previously, the links 25 which form the chain 24 are placed in a predetermined combination, such that the links 25 can differ in shape, so long as every link 25 is connected to an adjacent link 25 on both ends.

The second chain 30 is substantially the same as the original chain 24 including the identical combination of links 25. The combined widths of chain 24 and chain 30 essentially equal the width of a chain (not shown) prior to the present invention. Second chain 30 is then delayed with respect to the chain 24 so that a secondary blue link 32 is moved a predetermined amount from the blue link 28. For example, when the prior chain is replicated once to create two chains 24 and chain 30, the blue link of the second chain 30 is delayed by $$\frac{T}{2}$$

with respect to the blue link of the chain 24, where T is the period of rotation of the chain 24. However, the prior chain can be replicated (divided) multiple times to create multiple second chains, and the delaying of the multiple chains is dependent upon the number of times the chain is replicated (divided). A preferred placement of the multiple chains can be determined by the rules of symmetrical delaying as explained in preceding portions of this application. In other words, the chains can be phased such that any of the two consecutive chains are delayed by $$\frac{T}{m}$$

and no two repeating events start at the same time. Here, m is sum of equivalent parts (chains) and T is the time period of rotation of any of the chains. Thus, the equivalent blue links 32 are preferably proportionally or symmetrically placed with respect to the blue link 28. Symmetrical delaying is the most preferred way of phasing the various equivalent parts however it may sometimes require too many replications of the original component. For such cases, one may determine an "optimal delay number" that might differ from what's required by symmetrical delaying.

In operation, the chain assembly 23 is operably connected to a first sprocket 34 and a second sprocket 36. Typically, the chains 24, 30 and sprockets 34, 36 can be used in a transmission or transfer case on a motorized vehicle, but it is within the scope of the present invention, that the method be used where it is desirable to reduce NVH or the like. The blue link 28 is defined by arbitrarily choosing a beginning and end point of the chain 24 as described above. Then the repeating event is defined by a single rotation of the chain 24 so that the blue link 28 returns to its original position. During the repeating event, undesirable NVH is produced by the chain 24 when it contacts the first sprocket 34 and the second sprocket 36. Thus, the NVH is produced at certain harmonics during the repeating event. The second chain 30 is delayed so that the equivalent blue link 32 is delayed by $$\frac{T}{2}$$

from the blue link 28 where T is the period of rotation. Based upon the delaying relationship of the chain 24 and second chain 30, predetermined (all odd, as m=2) harmonics are eliminated or reduced from the response which eliminates or reduces the NVH produced by the chain 24 and secondary chain 30 when contacting the first sprocket 34 and second sprocket 36.

The number of harmonics reduced during the repeating event is directly related to the number of chains utilized, and how the secondary chains are subsequently delayed with respect to the first chain of the assembly. If the phasing or delaying relationship is based upon $$\frac{T}{m}$$

rule (symmetrical delaying) then the harmonics that remain unaffected based upon the delaying of the secondary chain 30 from the chain 24 are determined by the equation:

λm; where λ=1,2,3 ... and m=the total number of secondary chain(s) 30 and the chain 24.

The remainder of the harmonics are eliminated or reduced. However, it is very difficult and time consuming to symmetrically delay $$\left(\text{i.e. by using the } \frac{T}{m} \text{ rule}\right)$$

the equivalent blue links 32 from the blue link 28. In addition, the sprockets 34, 36 may be delayed with respect to one another further making it difficult aftain the exact delay requirement for the chains. If the phasing of the second chain 30 is not governed by "symmetrical delaying" relationships the harmonics that would otherwise be eliminated, are now only reduced. When a harmonic is not completely eliminated, the NVH produced by a given chain in the assembly at that harmonic is only reduced rather than completely eliminated.

Figure 3:
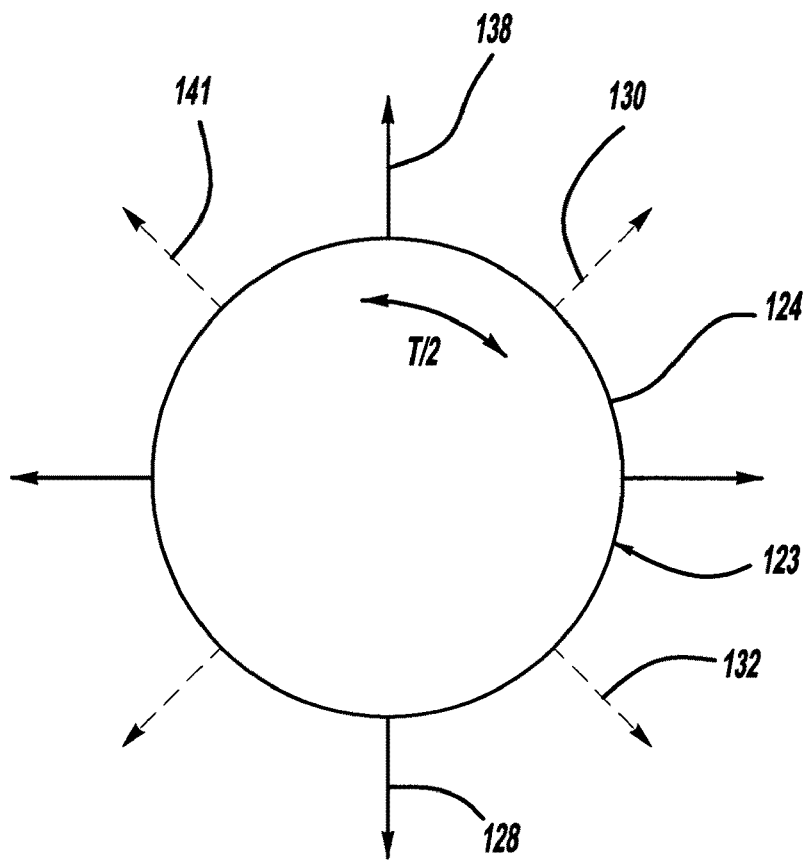
FIG. 3 is a schematic plan view of a sprocket assembly having an equivalent part delayed with respect to a component in accordance with an embodiment of the present invention.

Referring to FIG. 3, a second embodiment of the present invention is shown where the component can be a sprocket assembly generally indicated at 123 having a sprocket 124. Similar to the description above, the sprocket 124 has a series of teeth 138, where the choice of beginning or starting tooth 128 is arbitrary. Again, assuming all the teeth 138 are approximately alike, a repeating event provides the arbitrary beginning 128 completing a rotation of $$\frac{2\pi}{L}\text{rad};$$

where L is the number of teeth 138 on the sprocket 124. Here, the time taken for sprocket 124 to travel an angular distance of $$\frac{2\pi}{L}\text{rad}$$

will be the time period (T) of the repeating event.

Then the sprocket 124 is replicated (divided) so that an equivalent part of secondary sprocket 130 is formed from the original sprocket 124. Again, the secondary sprocket 130 is substantially similar to the sprocket 124, but if the secondary sprocket 130 is spliced from the sprocket 124, the sprocket 124 and the secondary sprocket 130 are thinner than the original sprocket 124. The starting points of the periodic event of the original sprocket 124 and secondary sprocket 130 are $$\frac{T}{m} = \frac{T}{2}$$

apart (delayed) as m=2. Here, m is the number of sprockets 124, 130.

In operation, the sprocket 124 and secondary sprocket(s) 130 are operably connected to a chain. Typically, the sprocket 124, sprocket(s) 130, and chain(s) are used in a transmission or transfer case in a motorized vehicle, but it is within the scope of the present invention, that the method is used where it is desirable to reduce NVH. As the sprocket 124 and secondary sprocket 130 rotate and contact the chain NVH is produced. By replicating the sprocket 124 and delaying the secondary sprocket 130, harmonics are eliminated or reduced which eliminates or reduces the NVH produced by the sprocket 124 and secondary sprocket 130. If the phasing or delaying relationship is based upon the $$\frac{T}{m}$$

rule (symmetrical delaying) then the harmonics which are unaffected by the delaying of the secondary sprocket(s) 130 are determined by the equation:

$\lambda m$; where $\lambda=1,2,3\ldots$ and m is the sum of secondary sprockets 130 and sprocket 124.

All of the remaining harmonics are eliminated or reduced.

When the load applied to the sprocket 124 and the secondary sprocket 130 are not equal, the uneven load distribution results in less than optimal NVH and durability performances. First, the durability of the overloaded sprocket 124 or overloaded secondary sprocket 130 is reduced when compared to a sprocket 124 and secondary sprocket 130 with an evenly distributed load because of the excess load in which the overloaded component must support. Also, the amount of NVH eliminated or reduced by reducing or eliminating harmonics in the repeating event due to the delaying of the secondary sprocket 130 with respect to the sprocket 124 is negatively affected.

In reference to FIGS. 3 and 9, when the load applied to the sprocket 124 and secondary sprocket 130 are not equal, an uneven load distribution results. As shown in the line graph in FIG. 9, for the case of symmetrical delaying, when the load distribution between the sprocket 124 and second sprocket 130 are equal the NVH at the harmonic is reduced is zero. However, when an uneven load distribution is applied between the sprocket 124 and the second sprocket 130, the NVH at the harmonic which otherwise goes to zero, now has some NVH but it is still less NVH than the amount produced at the harmonic if the second sprocket 130 was not phased from the sprocket 124. In FIG. 9, $\lambda=0$ corresponds to equal distribution of loads on the sprocket 124 and second sprocket 130, while $\lambda=\pm 1$ represents when the sprockets 124 or second sprocket 130 takes the entire load. It should be appreciated that the above description of the function referenced sprockets as an explanation but the function is applicable to all of the components described or the like.

Figure 5:
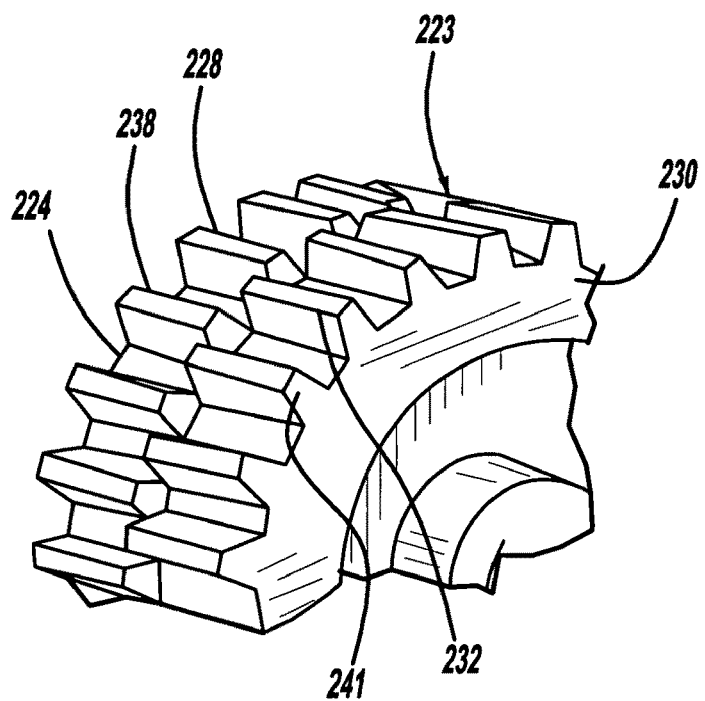
FIG. 5 is a perspective view of a gear assembly having an equivalent part delayed with respect to a component.
Figure 4:
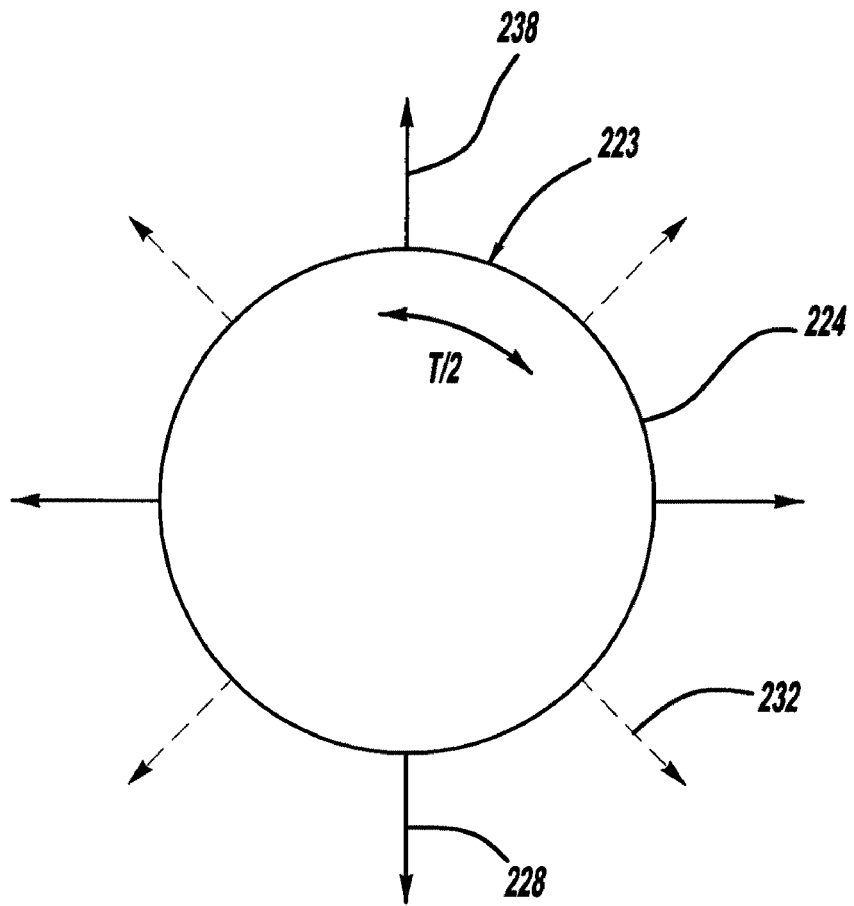
FIG. 4 is a schematic plan view of a gear assembly having an equivalent part delayed with respect to a component in accordance with an embodiment of the present invention.

In reference to FIGS. 4 and 5, the component can be a gear assembly generally indicated at 223 having a gear 224 that has teeth 238. Similar to the description above, the gear 224 rotates and has an arbitrary beginning gear tooth 228. Thus, the repeating event of the gear 224 is defined by the starting gear tooth 128 rotating $$\frac{2\pi}{L}\text{rad};$$

rad; where L is the number of teeth 238 on the gear 224. The time taken to rotate an angular distance of $$\frac{2\pi}{L}\text{rad}$$

rad is the time period (T) of repetition.

The gear 224 is replicated (divided) in order to create a second gear 230 with teeth 241. The start of the periodic event of the second gear 230 is delayed with respect to that of gear 224 in the same manner as the sprocket 124 described above in order to eliminate or reduce problem harmonics of the repeating event. Thus, the secondary gear 230 has an arbitrary beginning tooth 232 that is delayed with respect to the starting tooth 228 of the gear 224. The elimination or reduction of NVH by delaying the secondary gear 230 with respect to the gear 224 is based upon the same equations as the sprocket 124 described above. Likewise, it is preferred to evenly distribute the loads applied to the gear 224 and the secondary gear 230.

It should be appreciated that the above method is applicable for delaying other torsional force transfer members components in order to reduce NVH, which when in operation produce a repeating event, and are used to transfer forces.

Figure 6:
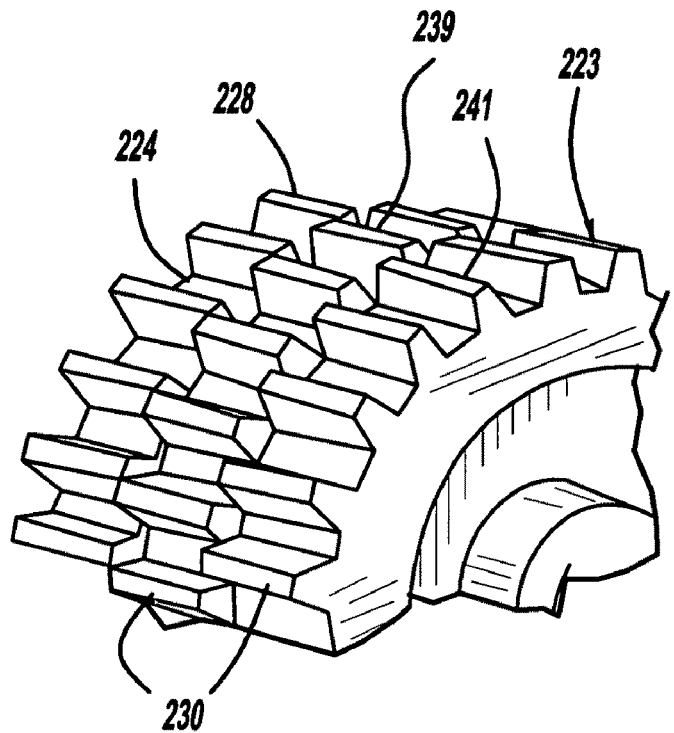
FIG. 6 is a perspective view of a gear assembly having a plurality of equivalent parts delayed with respect to the component.

In reference to FIG. 6, the gear assembly 223 has gear 224 being replicated (divided) multiple times to produce multiple (two) secondary gears 230. Secondary gears 230 are "symmetrically delayed" with respect to the gear 224 as governed by the $$\frac{T}{m}$$

rule. Here m is the number of secondary gears 230 and gear 224, and T is the time period of repetition of gear 224. Gears 224 and 230 can be one solid or connected piece or a series of separated gears on a common shaft (not shown).

More specifically, in FIG. 6, the gear 224 is replicated twice (m=3) so that the arbitrary starting tooth 239, 241 on the gears 230 are located $$\frac{1}{3}\frac{2\pi}{L}\text{rad and }\frac{2}{3}\frac{2\pi}{L}\text{rad }\left(\text{or deplayed by }\frac{T}{3}\text{and}\frac{2T}{3}\right)$$

away from the tooth 228 of gear 224. In the above example, all of the harmonics that are multiples of 3 (3, 6, 9 . . . ) are unaffected and the remaining harmonics (1, 2, 4, 5 . . . ) are reduced or eliminated. In another embodiment (not shown), the gear 230 having the starting tooth 241 can juxtapose the other two gears of the gear assembly.

Figure 7:
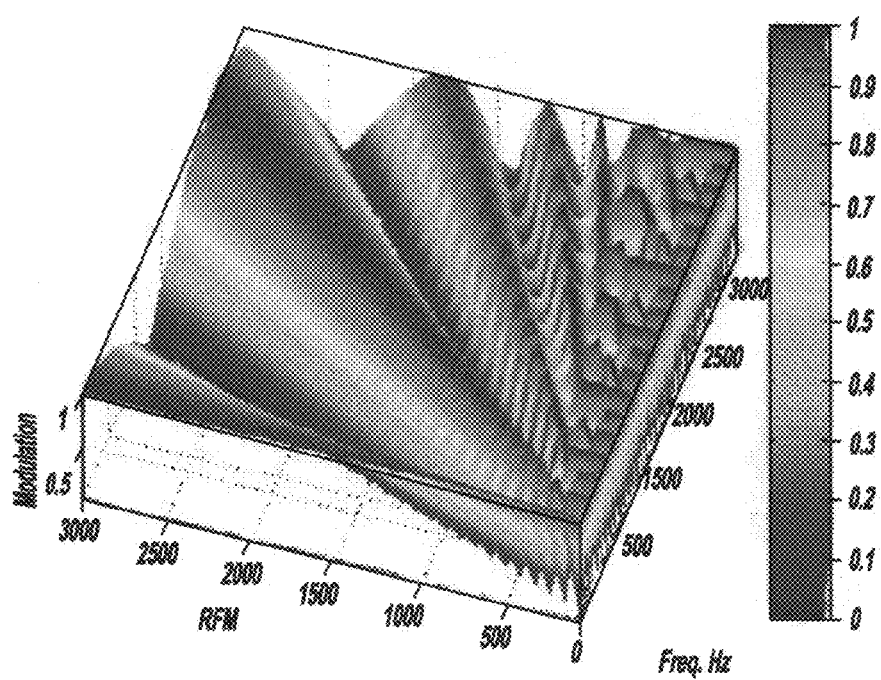
FIG. 7 is a chart of an envelope function for an assembly of one component and one equivalent part where the component is replicated once and the equivalent part is symmetrically delayed in operation in accordance with the present invention. An envelope function for an assembly of a component and m−1 equivalent entities is such that when it is multiplied by the NVH response of only one component, it gives the response due to the m phased component and equivalent entities put together. This envelope function is plotted for the case of symmetrical delaying when m=2. It can clearly be seen that at many locations on the graph (odd harmonics), the response is annulled.

Referring to FIG. 7, the graph shows the elimination or reduction of NVH harmonics for a sprocket which has been replicated once with the secondary sprocket 130 being 'symmetrically delayed" with respect to the original gear 124 (m=2). An envelope function, when multiplied by the NVH response of the original component 124 alone, reproduces the response from the assembly of sprockets 124 and 130 with the delaying relations. This envelope function is based upon the symmetrical delaying equation referenced above where the unaffected harmonics are determined by the equation:

$\lambda m, \lambda=1,2,3\ldots$

In this example, m=2 since the sprocket was replicated once and the secondary sprocket 130 is delayed with respect to the sprocket 124. Thus, for this case, all odd harmonics are eliminated or reduced. On the graph, the envelope function has a range from 0-1, where 1 is the amount of NVH produced by the sprocket when a single sprocket is used during operation. Thus, any point on the graph which is below 1 implies reduction of NVH when compared to an assembly where a single sprocket is used. Except for the harmonics which are integer multiples of m, there is an NVH reduction at all the other harmonics. It should be appreciated that the above description of the envelope function referenced gears as an explanation and not limitation, and the envelope function is applicable to the other components 24, 124, 224 or the like.

Figure 8:
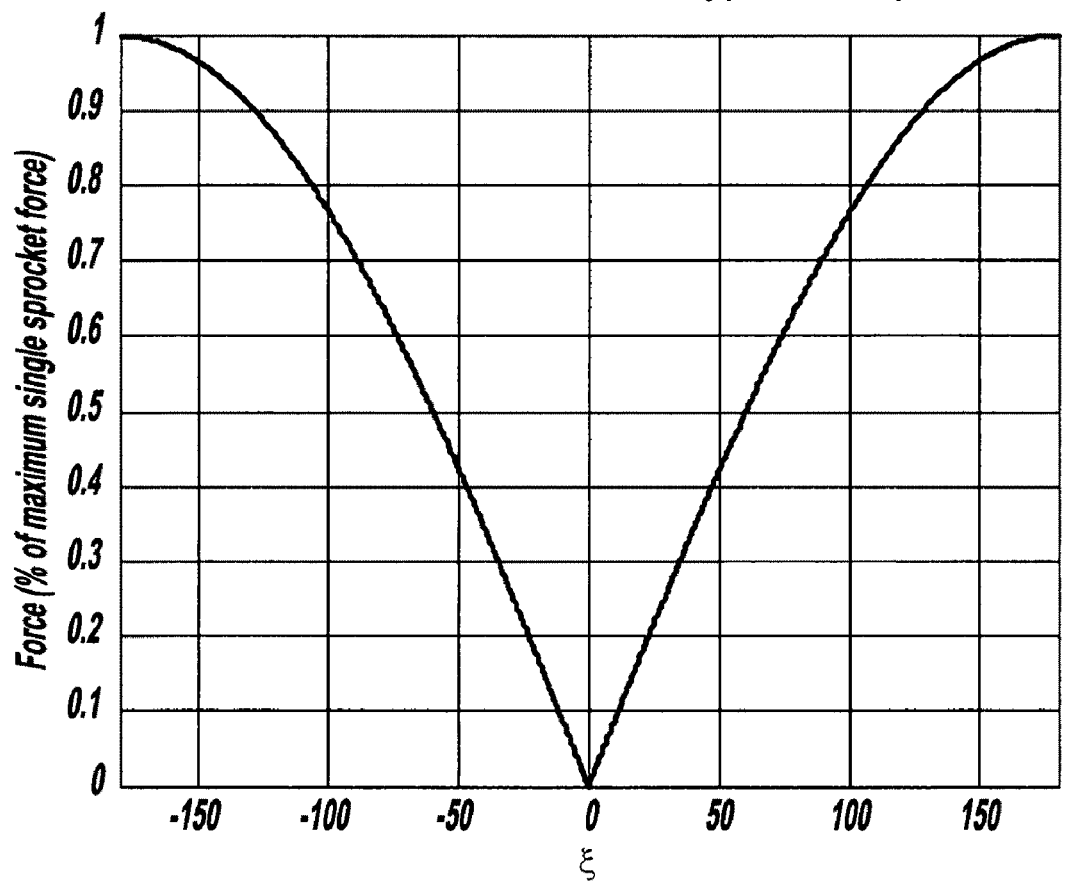
FIG. 8 is a line graph for a percentage of response of the original component at the first harmonic as a function of phasing error $$\left(\text{deviation from } \frac{T}{2} \text{ delay}\right)$$

In reference to FIG. 8, the line graph represents the NVH produced at a harmonic with varying load sharing between the sprockets 124, 130 for the case when m=2 and the sprocket 130 is symmetrically delayed with respect to sprocket 124. $\lambda=0$ when the two sprockets 124, 130 share equal loads and $\lambda=\pm 1$ when either one of the sprockets 124, 130 take all the load. It can be seen that the best NVH response is obtained for the case when the load sharing is equal between the two sprockets (λ=0). For a system of a sprocket 124 and m−1 equivalent sprockets 130 where all equivalent sprockets are symmetrically delayed and the load distribution is equal among all of the sprockets, the harmonics that are not multiples of m are eliminated. However, the responses at the harmonics that are multiples of m are not reduced and produce NVH equivalent to a system where a single sprocket is used. It should be appreciated that the above description of the graph referenced sprockets as an explanation and not limitation, and the function is applicable to other components 24, 124, 224, or the like.

With respect to the descriptions above of the method for delaying the components 24, 124, 224 and the equivalent parts 30, 130, 230, if reduction of the second harmonic is desired, the component 24, 124, 224 needs to be replicated at least twice to produce at least two equivalent parts 30, 130, 230 so that m equals three (m=3). If m equals three, then both the first and second harmonics (among others) will be eliminated. However, making multiple replications is expensive and at times it may be desirable to reduce the first and second harmonics as much as possible without replicating the component 24, 124, 224 multiple times and produce multiple equivalent parts 30, 130, 230. It is possible to reduce the NVH produced at the second harmonic even when m=2 if it is acceptable to compromise the performance at the first harmonic. Thus, the equivalent parts 30, 130, 230 are "asymmetrically delayed" with respect to the component 24, 124, 224, which results in a reduction of the first harmonic and second harmonic, but does not completely eliminate the first harmonic as if the equivalent parts 30, 130, 230 were symmetrically delayed by $$\frac{T}{2}.$$

It can be expensive to replicate or splice a component such as a chain, sprocket, or gear once and can be even more expensive to replicate the component multiple times. Also, the durability of a component can be reduced the more times the component is spliced. If the symmetric delaying relation is used $$\left(\frac{T}{m} \text{ rule}\right),$$

then the harmonics other than those that are integer multiple of m are completely eliminated and the harmonics that are integer multiple of m are completely unaffected. An alternative approach is to set up optimization citerion, which reduces the desired harmonics but does not completely eliminate all of the affected harmonics. The advantage of the optimization approach is that it can give a reasonably good solution with lesser number of replications of components (examples 30, 130, 230) than as mandated by symmetrical delaying $$\left(\frac{T}{m}\right)$$

rule. The disadvantage is that not all the problem harmonics will be annulled. The following equations are a general statement for optimization for determining the phasing of the equivalent parts 30, 130, 230 to reduce the desired harmonics where the components chain, sprocket, or gears are replicated (divided) m−1 times. For such a system, the amplitude of a dynamic quantity (like force, displacement etc) can be represented by $$R_{m,k}^2 = E_k^2 \left[ \begin{array}{l} \left(1 + \cos\left(2\pi k \frac{t_1}{T}\right) + \ldots + \cos\left(2\pi k \frac{t_{m-1}}{T}\right)\right)^2 + \\ \left(0 + \sin\left(2\pi k \frac{t_1}{T}\right) + \ldots + \sin\left(2\pi k \frac{t_{m-1}}{T}\right)\right)^2 \end{array} \right]$$

Or, $$R_{m,k} = E_k \sqrt{\left[ \begin{array}{l} \left(1 + \cos\left(2\pi k \frac{t_1}{T}\right) + \ldots + \cos\left(2\pi k \frac{t_{m-1}}{T}\right)\right)^2 + \\ \left(0 + \sin\left(2\pi k \frac{t_1}{T}\right) + \ldots + \sin\left(2\pi k \frac{t_{m-1}}{T}\right)\right)^2 \end{array} \right]}$$

Here, $R_{m,k}$ is the amplitude of the $k^{th}$ harmonic and m is the total number of original sprocket (gears) and equivalent sprockets (gears). $E_k$ will be equal to the amplitude if m=1 (i.e, with no phasing). $t_i$ is the delay between the start of periodic event on $i+1^{th}$ sprocket (gear tooth) and the start of periodic event on the first. Let's assume that the harmonics of interest are S, where, S={set of all harmoics of concern}

Then the optimization problem can be stated as follows.

Minimize $F(t_1,t_2,t_3,t_4, \ldots, t_{m-1})$ such that $F(t_1,t_2,t_3,t_4, \ldots, t_{m-1})=R_a+R_b+R_c+R_d+ \ldots +R_i$ Here,

[abcd . . . i]∈S

And $t_1,t_2,t_3,t_4, \ldots, t_{m-1}$ are the delays of interest.

In general, this optimization problem can be set-up for minimizing any number of harmonics (n) for components chains, sprockets, or gears with any number of equivalent parts 30, 130, 230 (m−1). As an example, if this method is used with one component 24, 124, 224 and one equivalent part 30, 130, 230 and the objective is to minimize both the first and second harmonics, the ability to completely eliminate the first harmonic is lost, but the benefit of reducing the second harmonic, which would otherwise be unaffected while using a two sprocket system with symmetrical delay, is gained. Therefore, depending on which harmonics are to be reduced and how many replications can be made, the optimal delaying time is determined. Such delaying times may result in delaying relationships other than as governed by the symmetrical delaying relation.

As mentioned previously, from a cost perspective many applications of the present invention are limited to one component 24, 124, 224 and one equivalent part 30, 130, 230. In an example, for a two sprocket system, it is desired to minimize the sum of amplitudes of first three harmonics such that the first and second harmonics are α and β times more important than the third harmonic respectively. Notice that if three replications were to be performed (m=4), the first three harmonics will all be annulled—an ideal solution. But assuming that we only want to make one replication, the following procedure shows the "best" or "optimal" delay for the case when m=2. For the case of one component 24, 124, 224 and one equivalent part 30, 130, 230, amplitude of any ($k^{th}$) harmonic can be written as:

$$Amplitude_k = \left|2\cos\left(\pi k \frac{t}{T}\right)\right|$$

Here, t is the delay between the starts of the two repeating events. This equation has been obtained by simplifying the expressions previously reported in the report. Hence, the optimization problem may be posed as minimization of function F(t) with respect to t, where, $$F(t) = \left|\alpha\cos\left(\pi\frac{t}{T}\right)\right| + \left|\beta\cos\left(2\pi\frac{t}{T}\right)\right| + \left|\cos\left(3\pi\frac{t}{T}\right)\right|$$

While a closed form solution is hard to find, one can plot F(t) for various values of t,α,β can be made to determine where the minima is reached. FIG. 10 shows the values of t (delay times) where a minima is reached for various values of α,β.

It can be seen that for small values of α & β, the optimum $$\frac{t}{T} \text{ is } \frac{1}{6}.$$

For small values of α and large values of β, the optimum t/T is ¼. For large values of α, and small values of β the optimum $$\frac{t}{T}$$

is invariably $$\frac{1}{2}.$$

Some specific cases are being pointed out here.
When α=0 and β=0.5, the best delay is $$\frac{T}{6}.$$

When α=0 and β=3, the best delay is $$\frac{T}{3}.$$

When α=3 and β=0, the best delay is $$\frac{T}{2}.$$

In general, the delays symmetrical and asymmetrical can be effective plus or minus 10%.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sprocket and chain assembly for transferring torsional force between at least first and second shafts comprising:
   a "m" number of identical chains wherein "m" equals at least two (2), each chain being fabricated from at least two types of links that differ slightly in their geometry, the different links of each chain being arranged in an identical random predetermined set pattern that repeats upon at least one revolution (T) of each chain;
   a "m" number of sprockets on each shaft for engagement with one of each said "m" number of chains; and
   wherein said chains are phased from one another on respective sprockets by $$\frac{T}{m} \pm \frac{0.1T}{m}$$

and wherein said sprockets on each shaft having L number of teeth, and said teeth are phased from one another $$\frac{2\Pi}{Lm}$$

radians from one another.

* * * * *